(12) United States Patent
Schaenzer et al.

(10) Patent No.: US 11,702,016 B2
(45) Date of Patent: Jul. 18, 2023

(54) MULTIPLE POSITION ACCESSORY MOUNT

(71) Applicants: Cole T Schaenzer, Royal Oak, MI (US); Jacob L Carpenter, Gaines, MI (US)

(72) Inventors: Cole T Schaenzer, Royal Oak, MI (US); Jacob L Carpenter, Gaines, MI (US)

(73) Assignee: FCA US LLC, Auburn Hills, MI (US)

( * ) Notice: Subject to any disclaimer, the term of this patent is extended or adjusted under 35 U.S.C. 154(b) by 173 days.

(21) Appl. No.: 17/101,237

(22) Filed: Nov. 23, 2020

(65) Prior Publication Data
US 2022/0161736 A1 May 26, 2022

(51) Int. Cl.
B60R 11/00 (2006.01)
B60Q 1/24 (2006.01)
B60J 7/185 (2006.01)
B60R 9/052 (2006.01)
B60R 11/02 (2006.01)

(52) U.S. Cl.
CPC .............. *B60R 11/00* (2013.01); *B60J 7/1851* (2013.01); *B60Q 1/24* (2013.01); *B60R 9/052* (2013.01); *B60R 11/0217* (2013.01); *B60R 2011/004* (2013.01)

(58) Field of Classification Search
CPC ..... B60R 11/00; B60R 11/0217; B60R 9/052; B60R 2011/004; B60R 2011/0085; B60J 7/1851; B60Q 1/24; F16M 2200/024
See application file for complete search history.

(56) References Cited

U.S. PATENT DOCUMENTS

| 1,995,656 | A  | * | 3/1935  | Stout     | F16M 13/02 256/64 |
| 7,523,904 | B2 | * | 4/2009  | Carnevali | F16M 13/02 248/176.1 |
| 7,959,120 | B2 | * | 6/2011  | Liao      | B60R 11/0252 248/292.12 |
| 8,317,152 | B1 | * | 11/2012 | Zhou      | F16M 13/00 248/397 |

* cited by examiner

Primary Examiner — Anita M King
(74) Attorney, Agent, or Firm — Jeremy J. Klobucar

(57) ABSTRACT

In at least some implementations, an accessory mount for a vehicle includes a first base, a support and a connector coupling the support to the first base. The first base has a first retainer with one or more retention features. The support has a second retainer that has one or more retention features that overlap one or more of the one or more retention features of the first retainer in different positions of the support relative to the first base. At least one of the first retainer and second retainer is movable relative to the other to decouple the first retainer and second retainer without removing the connector from the first base to enable movement of the support to multiple positions relative to the first base.

17 Claims, 6 Drawing Sheets

MULTIPLE POSITION ACCESSORY MOUNT

FIELD

The present disclosure relates to a mount for a vehicle accessory that permits movement of the accessory to multiple positions.

BACKGROUND

Some vehicles have accessories, such as a light, that may be mounted to the vehicle. Such lights may be mounted on the roof of the vehicle, above the windshield, and project light forward, over the front of the vehicle and onto terrain in front of the vehicle. The hard mounted lights might be able to pivot about the brackets that connect them to the vehicle to shine light more upward or downward, but the entire body of the lights cannot be moved to, for example a side of the vehicle to shine light on the side or toward the rear of the vehicle. Other accessories, like storage racks or support rods, may also be coupled the vehicle, in a fixed manner.

SUMMARY

In at least some implementations, an accessory mount for a vehicle includes a first base, a support and a connector coupling the support to the first base. The first base has a first retainer with one or more retention features. The support has a second retainer that has one or more retention features that overlap one or more of the one or more retention features of the first retainer in different positions of the support relative to the first base. At least one of the first retainer and second retainer is movable relative to the other to decouple the first retainer and second retainer without removing the connector from the first base to enable movement of the support to multiple positions relative to the first base.

In at least some implementations, an accessory is carried by or has a body defining the support. The support may carry a light, speaker, or other accessory or the support may be a simple bar, rod or bracket to which other things may be coupled. For example, a bike, kayak, storage container (e.g. rooftop storage container), canopy, portion of a tent, or the like may be coupled to the support.

In at least some implementations, the support is rotatable about the connector when the first retainer and second retainer are decoupled. The first retainer and the second retainer may be arranged to be coupled together in multiple positions of the support relative to the first base, and to releasably retain and limit or prevent rotation of the support relative to the first base in the multiple positions.

In at least some implementations, the connector defines an axis of rotation about which the support is rotatable relative to the first base, and the connector may extend through both a first opening in the first retainer and a second opening in the second retainer. The one or more retention features of the first retainer and the one or more retention features of the retention features of the second retainer may be circumferentially spaced apart relative to the axis of rotation, and the support may be rotated to multiple positions relative to the first base. In multiple positions of the support relative to the first base, the first retainer and second retainer can be coupled with one or more of the one or more retention features of the first retainer overlapping one or more of the one or more retention features of the second retainer to limit or prevent rotation of the support relative to the first base.

In at least some implementations, the first retainer is movably carried by the first base for axial movement relative to the second retainer, and the first retainer has an advanced position in which the retention features of the first retainer axially overlap the retention features of the second retainer, and a retracted position in which the retention features of the first retainer do not axially overlap the retention features of the second retainer. The second retainer could also or instead by movable relative to the first retainer, if desired. A biasing member may act on the first retainer and provide a force on the first retainer yieldably biasing the first retainer to the advanced position.

In at least some implementations, the connector includes a shank that extends axially from a first end connected to the first base to a second end that radially overlies or overlaps part of the support to axially retain the support relative to the first base while permitting rotation of the support relative to the first base when the first retainer and the second retainer are decoupled.

In at least some implementations, the mount includes a second base having a third retainer with one or more retention features, and the support has a fourth retainer releasably coupled with the third retainer, the fourth retainer has one or more retention features that cooperate with one or more of the one or more retention features of the third retainer in different positions of the support relative to the first base. A second connector may couple the support to the second base, and at least one of the third retainer and the fourth retainer is movable relative to the other to decouple the third retainer and fourth retainer without removing the second connector from the second base to enable movement of the support relative to the second base.

In at least some implementations, the support is rotatable about either the second connector or about the connector coupling the support to the first base, and either the connector coupling the support to the first base is removable from the first base to permit the support to be rotated about the second connector, or the second connector is removable from the second base to permit the support to be rotated about the connector coupling the support to the first base.

In at least some implementations, an accessory mount for a vehicle has a first base, a support and a connector. The first base has a first retainer with one or more retention features. The support has a second retainer that has one or more retention features that overlap one or more of the one or more retention features of the first retainer in different positions of the support relative to the first base. The connector couples the support to the first base, and the connector has a shank that extends axially from a first end connected to the first base to a second end that radially overlies or overlaps part of the support to axially retain the support relative to the first base. The first retainer is movably carried by the first base for movement relative to the second retainer, and the first retainer has an advanced position in which the retention features of the first retainer overlap the retention features of the second retainer, and a retracted position in which the retention features of the first retainer do not overlap the retention features of the second retainer so that the support can be rotated relative to the first base without removing the connector from the first base.

In at least some implementations, the connector defines an axis of rotation about which the support is rotatable relative to the first base, and wherein the connector extends through both a first opening in the first retainer and a second opening in the second retainer. In at least some implementations, the one or more retention features of the first retainer and the one or more retention features of the retention features of the second retainer are circumferentially spaced apart relative to the axis of rotation, and the support may be rotated to multiple positions relative to the first base and in multiple positions of the support relative to the first base the first retainer and second retainer can be coupled with one or more of the one or more retention features of the first retainer overlapping one or more of the one or more retention features of the second retainer to limit or prevent rotation of the support relative to the first base.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
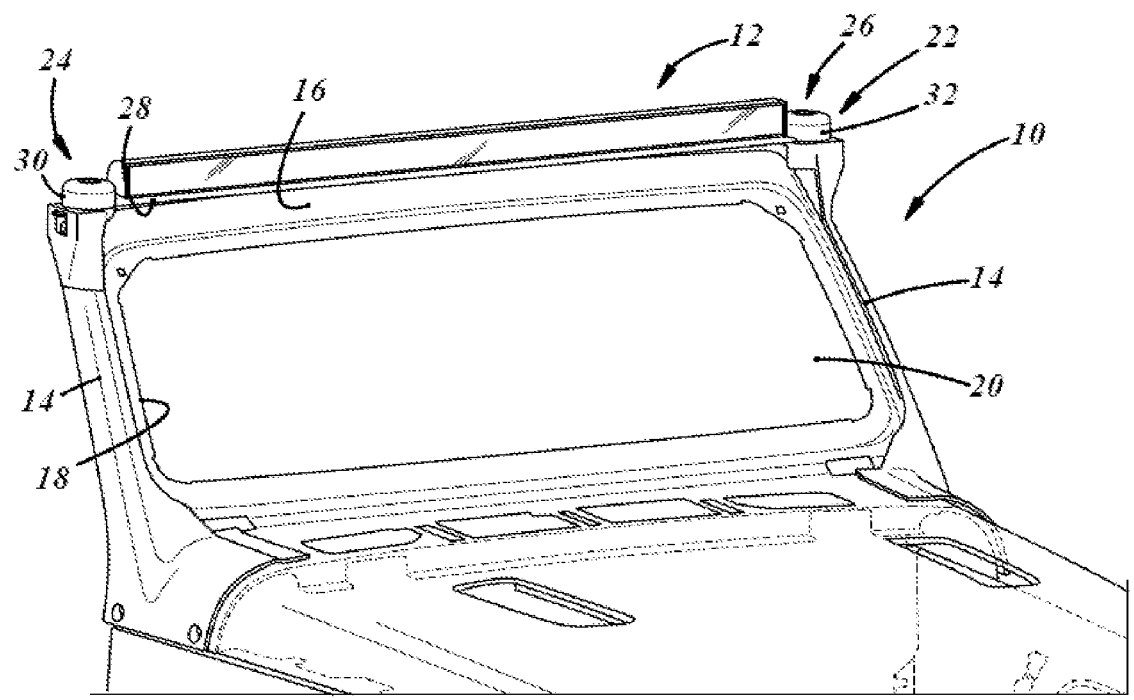
FIG. 1 is a perspective view of a portion of a vehicle frame including front support pillars and a cross member that define a windshield opening, and an accessory mounted to the vehicle in a first position.
Figure 2:
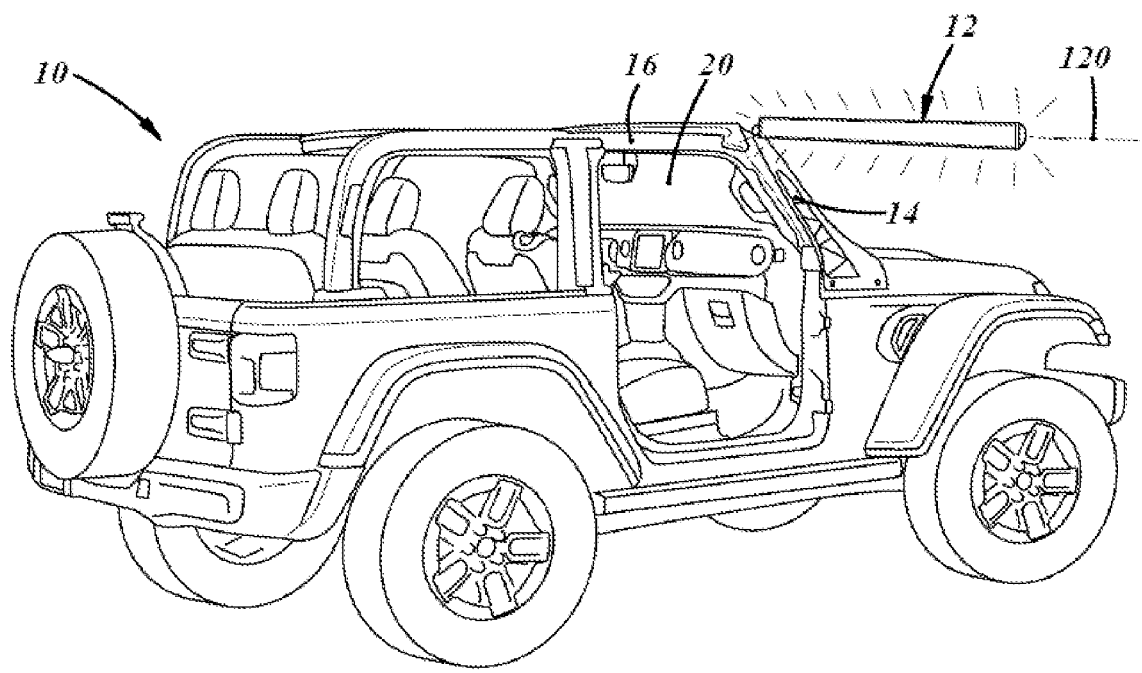
FIG. 2 is a perspective view of the vehicle showing the accessory in a second position.
Figure 3:
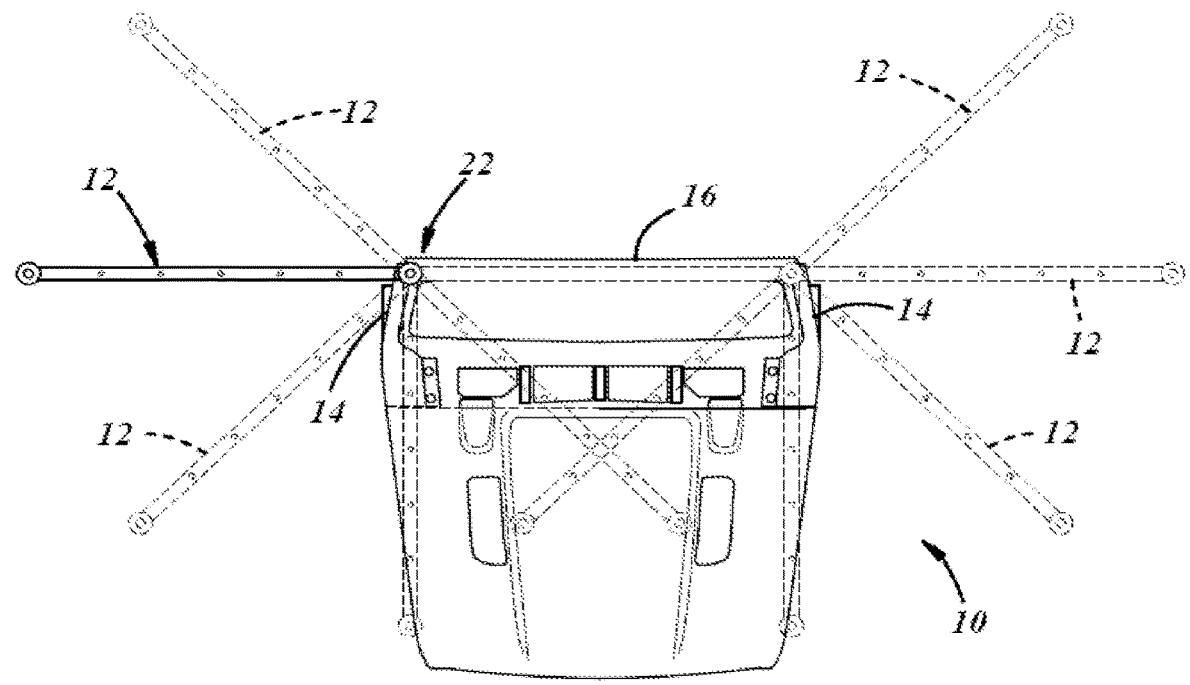
FIG. 3 is a plan view illustrating multiple positions of the accessory.

Referring in more detail to the drawings, FIG. 1 illustrates a vehicle 10 with an accessory 12, shown as a light bar, mounted to the exterior of the vehicle 10. In the example shown, the accessory 12 is mounted to one or more of the front pillars 14 and a cross member 16 extending between the front pillars 14, where the cross member 16 and pillars 14 define an opening 18 for a windshield 20. The accessory 12 may be mounted to a different portion of the vehicle 10, and the accessory 12 may be something other than a light or lights, such as but not limited to, a speaker, support 28 for a canopy, a bracket or brace to which other items, like a bike, kayak, or storage container, may be connected. As shown in FIGS. 2 and 3, the accessory 12 may be moved relative to the vehicle 10, to multiple positions, and as explained below the accessory 12 may be releasably retained in multiple positions relative to the vehicle 10 by a mount 22.

Figure 4:
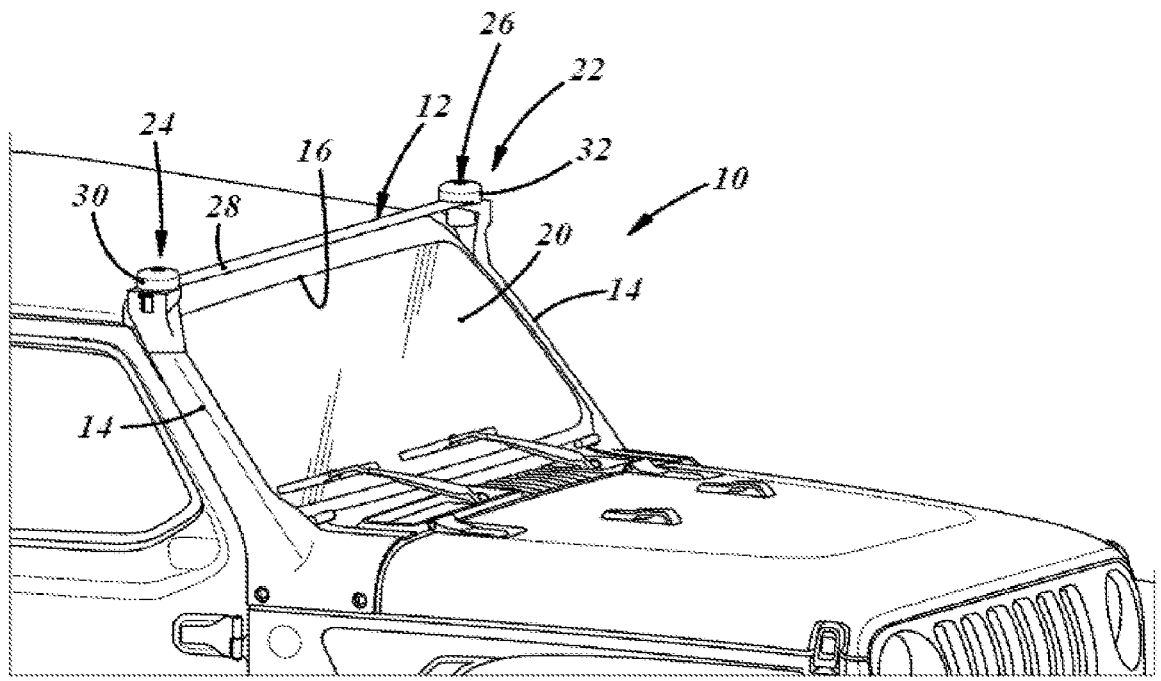
FIG. 4 is a perspective view of a front portion of the vehicle illustrating a support for one or more accessories, the support is coupled to a first base and a second base that are in turn connected to the vehicle.

As shown in FIGS. 3 and 4, the mount 22 may include a first base 24, a second base 26 and a support 28 coupled to the first base 24 at or near a first end 30 and to the second base 26 at or near a second end 32. The first base 24 and second base 26 may be coupled to any desired vehicle 10 structural member, such as one or both of the support pillars 14 and the cross member 16, to mount the accessory 12 above the windshield 20. In this example, the first base 24 may be connected to or adjacent to one pillar 14 and the second base 26 may be connected to or adjacent to the other pillar 4. Other arrangements may be used, for example, only a first base 24 may be provided, one or both bases 24, 26 may be positioned in different positions on the vehicle 10 to position the accessory 12 is a different position above, on a side of or below the windshield 20, or in a different location on the vehicle 10 spaced from the windshield 20 (e.g. on or adjacent to a side or the rear of the vehicle 10, or a front of the vehicle 10, e.g. near a front bumper). As used herein, the term or "structural member" is intended to refer to a portion of the vehicle 10 frame, main support structure, body panel, bumper, fascia or other component to which a support 28 and/or accessory 12 could be mounted.

To change the position of the accessory 12 relative to the vehicle 10, the support 28 may be decoupled from either the first base 24 or second base 26 (in the example wherein the support 28 is coupled to two bases), and the support 28 may be moved relative or about the base to which it remains connected. This is shown in FIG. 3 in which the accessory 12 is shown in multiple positions when coupled to only the first base 24 and in multiple positions when coupled to only the second base 26. In this example, the accessory 12 rotates about an axis defined by the first base 24, such as by a post or connector 34 that retains the support 28 on the first base 24. In at least some implementations, the support 28/accessory 12 may be releasably retained in more than one position (i.e. multiple positions) relative to the first base 24 or second base 26, as described in more detail below.

Figure 5:
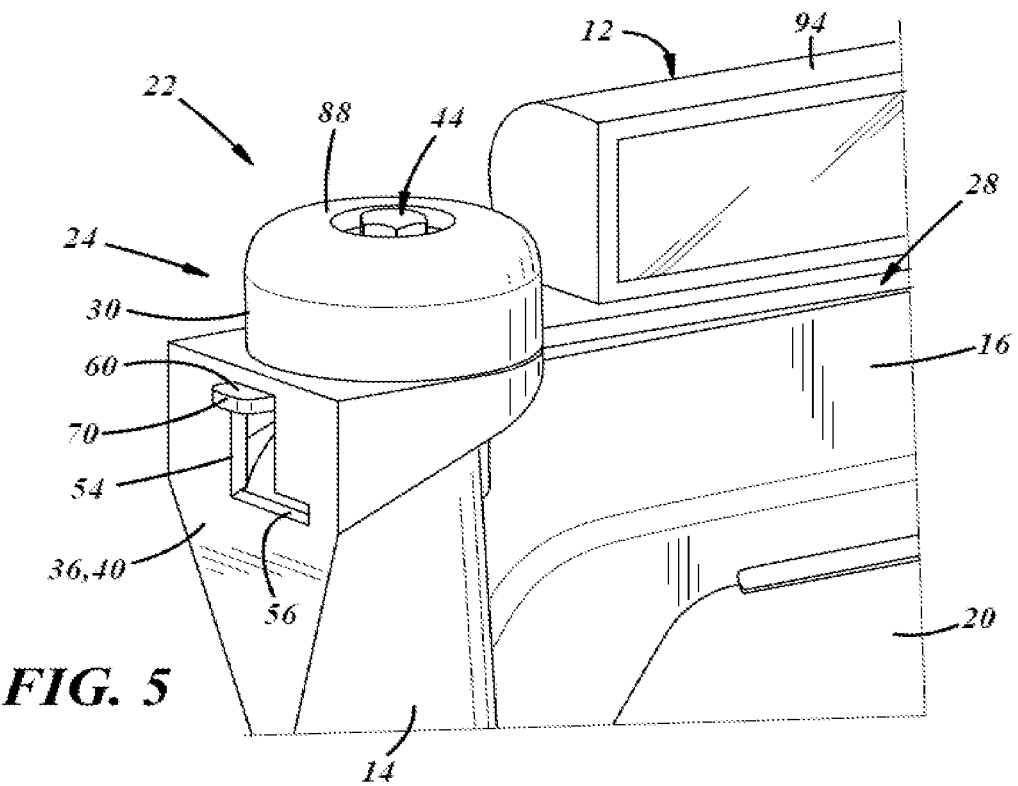
FIG. 5 is an enlarged fragmentary perspective view showing the first base and a portion of the support.
Figure 6:
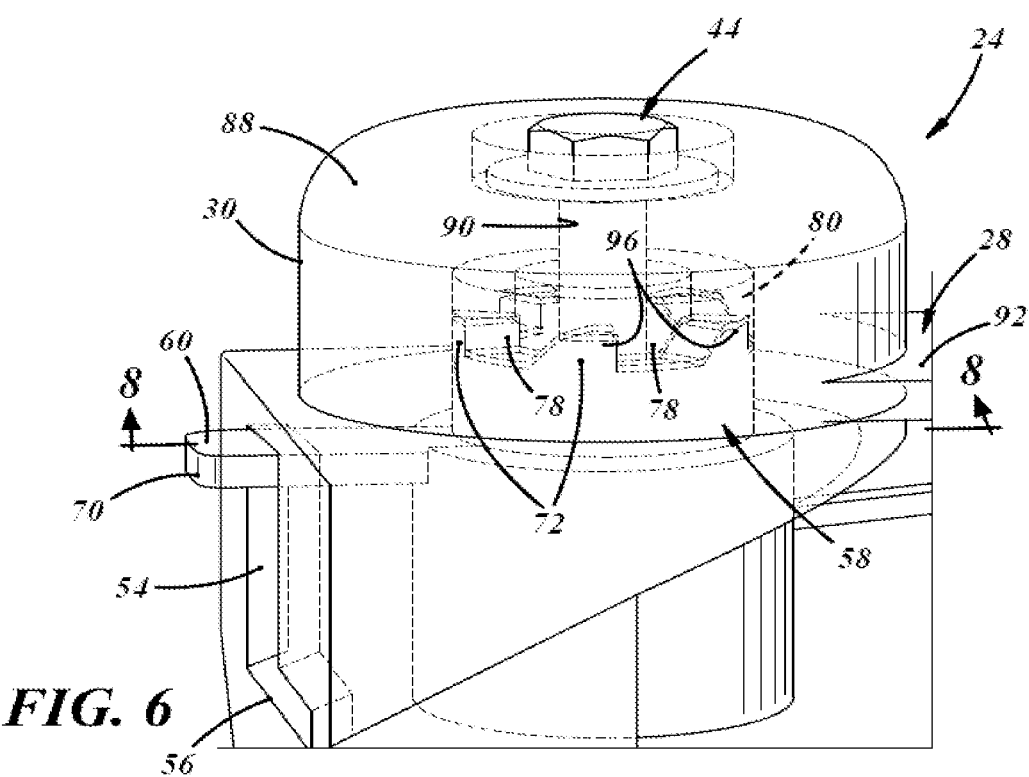
FIG. 6 is a perspective view of the first base and part of the support, shown transparent to illustrate internal features and components of each.
Figure 8:
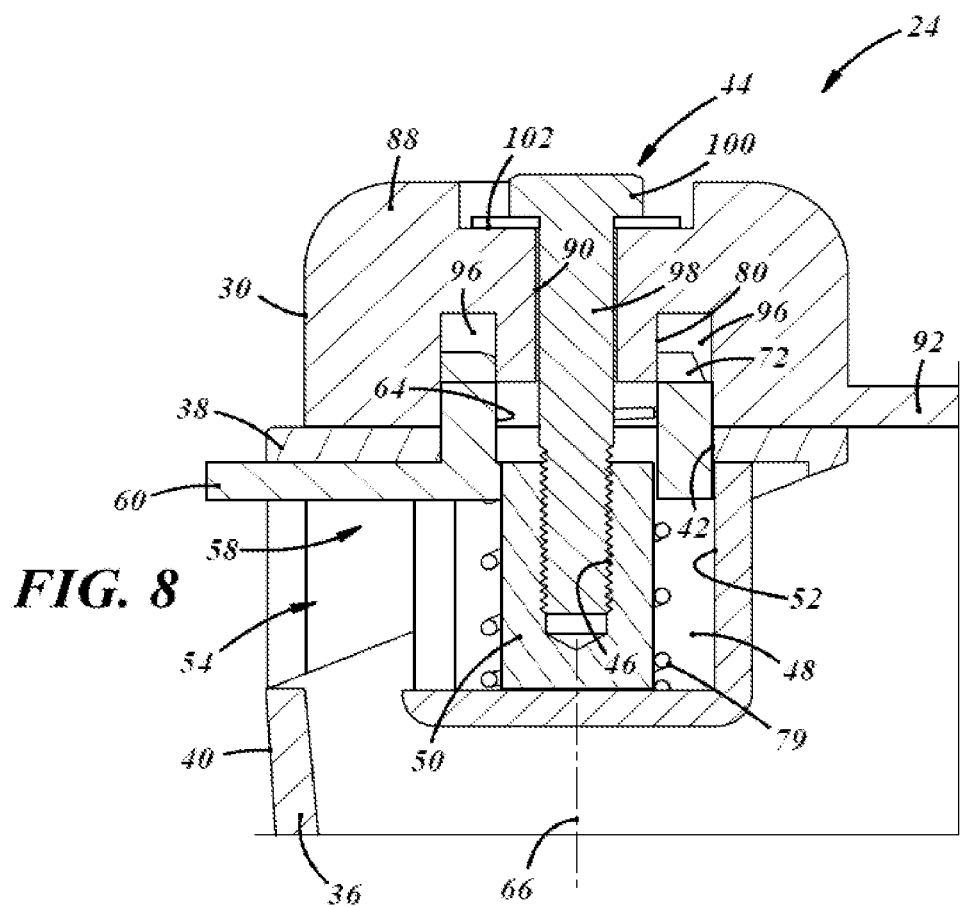
FIG. 8 is a sectional view of the first base and part of the support.

As shown in FIGS. 5, 6 and 8, the first base 24 includes a main body 36 carried by or formed integrally with and defined by a structural member of the vehicle 10, such as a pillar 14 or cross beam 16. The main body 36 in the implementation shown is separate from and connected to the vehicle 10 structural member to retain the main body 36 in a fixed position relative to the vehicle 10. So that the first base 24 is accessible for mounting the support 28 thereto, the main body 36 may be received in an opening in the vehicle 10 structural member and may extend partially out of the opening. A portion of the first base 24, which may include part of the main body 36 or a cover 38 (FIG. 8) fixed to the main body 36, may define part of an exterior of the vehicle 10 when installed, and an outer surface 40 of the main body 36 may be a show surface visible from the exterior of the vehicle 10.

As shown in FIG. 8, to facilitate coupling the support 28 to the first base 24, the first base 24 includes an opening 42 through the main body 36 and/or cover 38, facing outwardly from the structural member for receipt of a connector 44 which secures the support 28 to the main body 36. The main body may have an internal opening 46, all or a portion of which may be threaded, and the internal opening 46 may be aligned with the opening 42 in the main body 36/cover 38.

A void 48 may surround the portion of the main body 36 in which the internal opening 46 is located such that the internal opening 46 is defined in a tubular portion 50 of the main body 36 and space exists between the tubular portion 50 and an internal sidewall 52 of the main body 36. A side opening 54 in the main body 36 may extend through the sidewall 52 of the main body and be exposed to the exterior of the vehicle 10. As shown in FIGS. 5 and 6, the side opening 54 may include a lateral or circumferentially extending slot 56 adjacent the lower end. A first retainer 58 carried by the first base 24 may have a lever 60 that extends out of the side opening 54 and may be manually actuated to move the first retainer 58, as described in more detail below.

Figure 7:
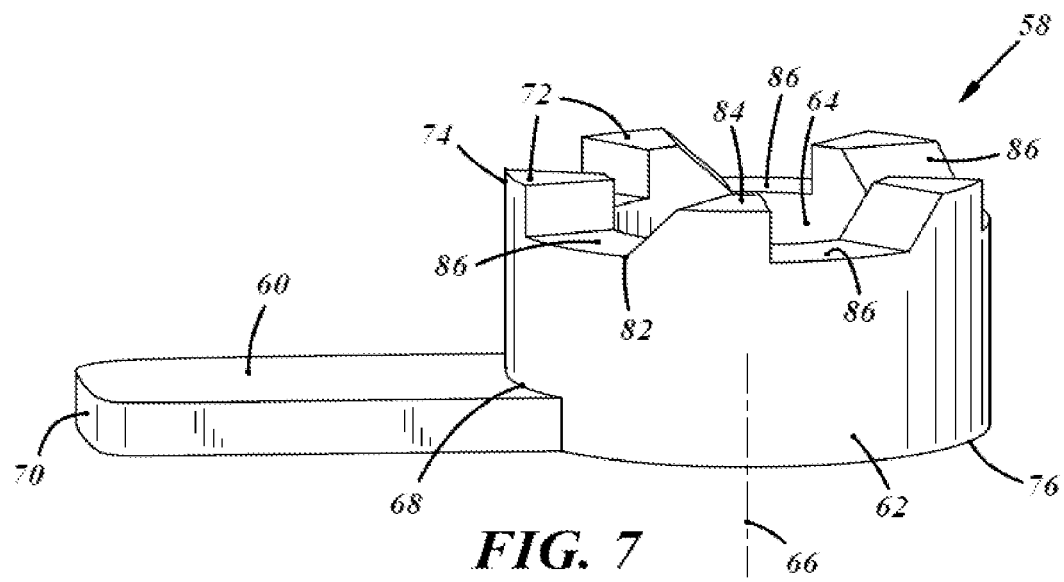
FIG. 7 is a perspective view of a first retainer of the first base.

The first retainer 58 may have a tubular body 62 and the lever 60 is connected to the tubular body and extends laterally from the tubular body. The tubular body 62 has an opening 64 (labeled in FIGS. 7 and 8) that receives the tubular portion 50 of the main body 36 and permits axial movement of the first retainer 58 relative to the main body 36 and its tubular portion 50. To facilitate moving the first retainer 58 relative to the main body 36, the lever 60 that may extend radially (relative to the axis 66 of the opening 64) or at desired angle from a first end 68 connected to the tubular body 62 to a free end 70 spaced from the tubular body 62. The free end 70 of the lever may extend out of the side opening 54 in the main body 36 for manual actuation of the first retainer 58.

The first retainer 58 includes one or more retention features 72 which may be provided at one axial end 74 (FIG. 7) of the retainer body 62 that, in assembly, is nearer to the support 28 than is the other axial end 76 (FIG. 7) of the retainer body. In at least some implementations, the retention features 72 include one or more projections or voids, and the retention features 72 may be arranged to selectively mate with one or more retention features 78 (FIG. 6) of a second retainer 80 that is coupled to the support 28.

In examples wherein the first retainer 58 moves axially, the retention features 72 are oriented axially, that is, they may extend in the axial direction and may be coupled and decoupled from the second retainer 80 and its retention features 78 when the first retainer 58 is moved axially. If, however, the first retainer 58 is moved radially (relative to the axis 66 of the connector opening 46, which may be coaxial with the tubular body 62), then the retention features 72 would be oriented radially, for radial mating or meshing with retention features 78 of the second retainer 80.

In the example shown, the first retainer 58 includes multiple projections 72 that extend axially from a first end 82 connected to the retainer body 62 to a free end 84 (labeled in FIG. 7), and the projections 72 are circumferentially spaced apart around the opening 64 (e.g. about axis 66) in the first retainer 58 with circumferentially extending gaps 86 between adjacent ones of the projections 72. The projections 72 may be evenly spaced apart, or spaced apart in any desired manner. Any number of projections 72 may be provided. Instead of or in addition to projections 72, the first retainer 58 may include voids extending into the tubular body 62 and arranged to receive projections 78 of the second retainer 80. To yieldably bias the first retainer 58 toward the support 28, a biasing member, such as a spring 79 is received within the void 48 and is engaged with the second axial end 76 of the tubular body 62.

As shown in FIGS. 5, 6 and 8, the support 28 includes a body 88 having an opening 90 adjacent to one end (e.g. first end 30) and a lateral portion 92 that extends away from the opening 90, and toward the second base 26 (in implementations including a second base 26). As shown in FIG. 5, a housing 94 of the accessory 12 may be coupled to the lateral portion 92 of the support 28 and may move with the support 28 as the support 28 is moved relative to a base 24, 26. Instead of having an accessory 12 separately coupled to the support 28, the support 28 may be integrally formed with a housing for the accessory such that the housing and lateral portion 92 are one-piece of material or otherwise formed in one unitary component. Further, the support 28 itself, which may be a simple cross-member extending between the bases 24, 26, or have any desired size and shape, may be deemed to be an accessory 12 without an additional component attached thereto. The support 28 may, for example, provide a bracket or post to which other items (e.g. a canopy, storage container, bike, kayak, etc.) may be coupled. Accordingly, and as shown in FIG. 4, nothing else needs to be connected to the support 28 (e.g. no lights or speaker) which may by itself define an accessory for the vehicle.

To retain the support 28 in a desired angular or rotated position relative to the first base 24, the support 28 includes or is connected to the second retainer 80. The second retainer 80 may be complementary to the first retainer 58 or otherwise provided with one or more retention features 78 arranged to mate with or otherwise overlap (in the direction of movement of the support) the retention features 72 of the first retainer 58 in multiple positions of the support 28. In at least some implementations, the second retainer 80 is fixed to the support 28, so that the second retainer 80 does not move relative to the support 28, and the second retainer 80 may be integrally formed in the support 28. That is, the second retainer 80 may be defined by features integrally formed in the same piece of material as the adjacent/surrounding portion of the support 28 or all of the support 28 if the support 28 is formed in one piece. The second retainer 80 could be a component formed separately from the support 28 and later connected to the support 28, if desired.

In the implementation shown, the support 28 includes one or more retention features 78 which may be provided in the area of the support 28 that overlaps the first base 24 (when the support 28 is coupled to the first base 24). In at least some implementations, the retention features 78 of the support 28 are complementary to the retention features 72 of the first retainer 58, and the retention features 78 may be arranged to selectively mate or overlap with one or more retention features 72 of the first retainer 58. In examples wherein the first retainer 58 moves axially, the retention features 78 may be oriented axially, that is, they may extend in the axial direction and may be coupled and decoupled from the first retainer 58 and its retention features 72 when the first retainer 58 is moved axially. If, however, the first retainer 58 is constructed to move radially (relative to the axis of the connector opening), then the one or more retention features 78 of the second retainer would be oriented radially, for radial mating or meshing with retention features 72 of the first retainer 58.

In the example shown, the second retainer 80 includes multiple projections 78 that extend axially from a first end connected to the support 28 to a free end, and the projections 78 are circumferentially spaced apart around the opening in the support 28 with circumferentially and axially extending gaps 96 (FIGS. 6 and 8) between adjacent ones of the projections 78. The projections 78 may be evenly spaced apart, or spaced apart in any desired manner. Any number of projections 78 may be provided. Instead of or in addition to projections 78, the second retainer 80 may include voids extending into the support 28 and arranged to receive projections 72 of the first retainer 58. So arranged, the projections 72, 78 of the first and second retainers 58, 80 are radially and axially overlapped when the first and second retainers 58, 80 are coupled together to inhibit or prevent relative rotation of the support 28 relative to the first base 24.

To axially retain the support 28 on the first base 24, the connector 44 may be received through the openings 42, 90 in the first base 24 and the support 28, respectively, and may connect these components together. In the implementation shown in FIG. 8, the connector 44 has a shank 98 at least part of which is threaded, and the internal opening 46 in the first base 24 is at least partially threaded for threaded engagement of the connector 44 to the first base 24 within the opening 46. The connector 44 includes a head 100 that either radially overlaps the support 28 or traps a component like a washer 102 against the support 28 to axially trap the support 28 in position relative to the first base 24.

The second base 26 may be constructed in the same manner as the first base 24, if desired. Accordingly, and for ease of description, the second base 26 will not be further described, and to avoid confusion, the retainer carried by the second base 26 will be called a third retainer, the associated retainer carried by the support 28 will be called a fourth retainer, and the connector at the second base 26 will be called a second connector. The third retainer may be constructed and arranged like the first retainer 58, the fourth retainer may be constructed and arranged like the second retainer 80, and the second connector may be constructed and arranged like the connector 44 coupled to the first base 24 (which may be called a first connector). Further, movement of the support 28 will be described below with reference to the first base 24. It is understood that the same procedures with respect to the first and second bases 24, 26 may be reversed to permit rotation of the support 28 about the second base 26.

Figure 11:
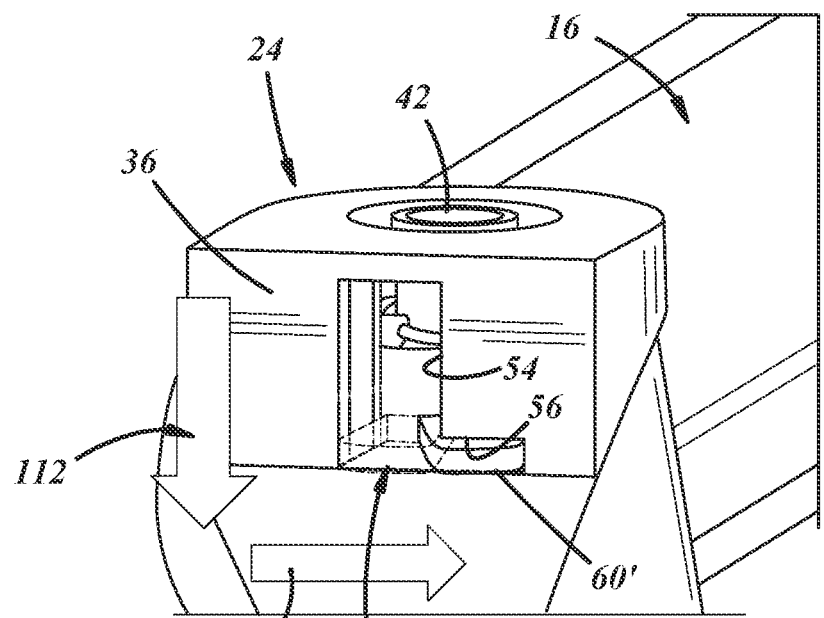
FIG. 11 is an enlarged, fragmentary perspective view showing a first retainer in a retracted and stowed position.
Figure 12:
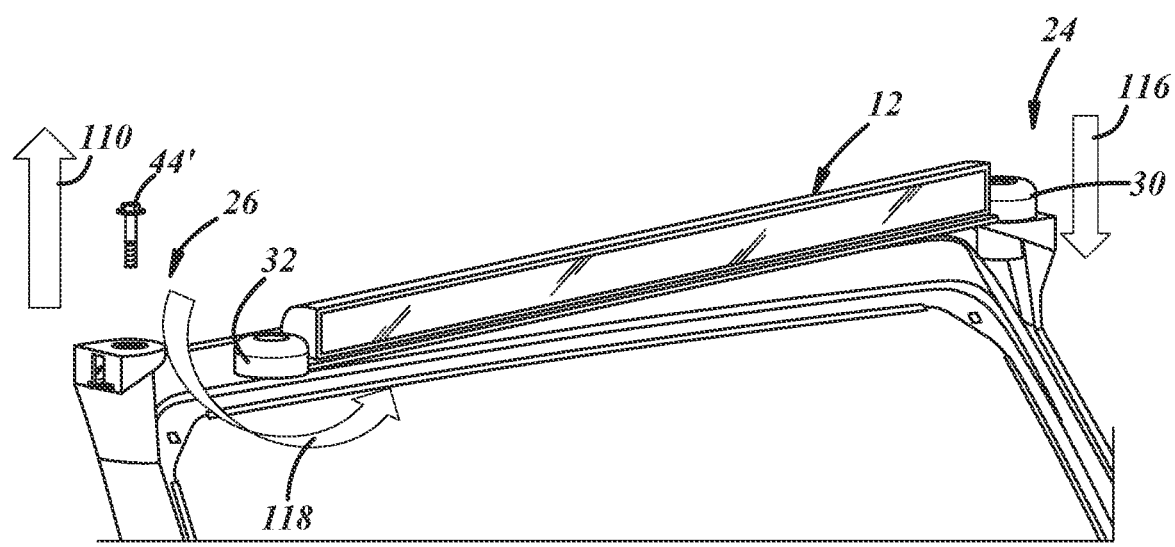
FIG. 12 is a perspective view of a portion of the vehicle showing a process or method for decoupling and moving a support relative to the vehicle.

To rotate the support 28 relative to the first base 24, the support 28 is decoupled from the second base 26, e.g. by removing the second connector 44' coupling the support 28 to the second base 26, as shown by arrow 110 in FIG. 12. Next, as shown in FIG. 11, the third retainer 58' of the second base 26 is decoupled from the associated fourth retainer of the support 28, e.g. by applying a force on the lever 60' to axially move the third retainer 58' to the retracted position against the force of the spring 79 biasing the third retainer 58', as shown by arrow 112 in FIG. 11. The lever 60' may be moved to the extension slot 56 in the side opening 54 of the second base 26 to a stowed position, shown by arrow 114 in FIG. 11, to hold the third retainer 58' in the decoupled or retracted position without the need to continue to apply a force to the third retainer 58'. So arranged, neither the second connector 44' nor the third retainer 58' interferes with movement of the support 28 away from the second base 26.

However, the rotational position of the support 28 is still retained by the first retainer 58 of the first base 24 and associated second retainer 80 of the support 28, which remain coupled. To decouple the first retainer 58 from the associated second retainer 80 of the support 28, a force is applied to the lever 60 to axially move the first retainer 58 to the retracted position against the force of the spring 79 biasing the first retainer 58, as shown by arrow 116 in FIG. 12. The lever 60 of the first retainer 58 may be moved to the extension slot 56 in the side opening 54 of the first base 24 to hold the first retainer 58 in a stowed position, without the need to continue to apply a force to the first retainer 58. In this position, the retention features 72 of the first retainer 58 do not overlap the retention features 78 of the second retainer 80 and do not interfere with rotation of the support 28 about the first base 24 and away from the second base 26.

The first connector 44 remains in position and axially couples the support 28 to the first base 24, and the support 28 may be rotated about the first connector 44, as shown by arrow 118 in FIG. 12. In this way, the connector defines an axis of rotation about which the support is rotatable relative to the first base, and the connector may extend through both a first opening 64 in the first retainer 58 and a second opening 90 in the second retainer 80.

In this way, the support 28 is easier to move and may be moved in a more controlled manner than if the support 28 were totally decoupled from the first base 24 and the second base 26 (e.g. by removing both connectors 44, 44'). After rotating the support 28 to a desired position, the first retainer 58 may be moved back to its advanced position, in which the retention features 72 of the first retainer 58 are adjacent to and overlap the retention features 78 of the second retainer 80, to thereby retain this position of the support 28 and inhibit or prevent further rotation of the support 28. When the support 28 is returned to the first or original position, e.g. the position shown in FIGS. 1, 4 and 5, the second connector 44' may be reconnected to the second base 26 and the third retainer 58' recoupled to the fourth retainer, to return the support 28 to its fully connected position. So arranged, the first retainer and the second retainer (and the third retainer and fourth retainer) are adapted to be coupled together in multiple positions of the support relative to the first base, and to releasably retain and limit or prevent rotation of the support relative to the first base in the multiple positions.

In implementations wherein the support 28 is connected to or part of a light, rotating the support 28 enables the light to illuminate different areas of the vehicle 10 and/or the area around the vehicle 10. Such a light may be movable relative to the support 28, such as by rotation about an axis 120 (FIG. 2) or centerline of the support 28, to permit the light to shine upwards, outwards or downwards. As noted above, the support 28 can be used for accessories other than a light. For example, the support 28 shown in FIG. 4 can be rotated toward a side of the vehicle 10 and a canopy or tent may be connected to the support 28. Of course, other uses are possible and will become apparent in view of this description.

Figure 9:
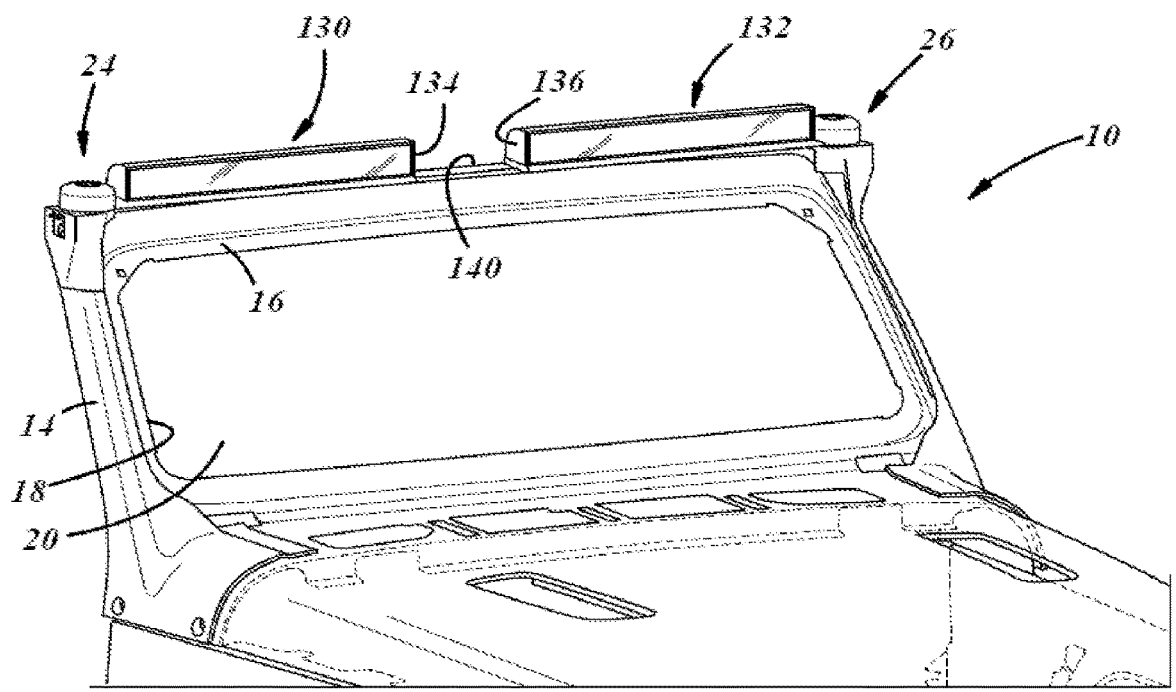
FIG. 9 is a perspective view of a front portion of the vehicle illustrating two accessories with one coupled to the first base and one coupled to the second base.
Figure 10:
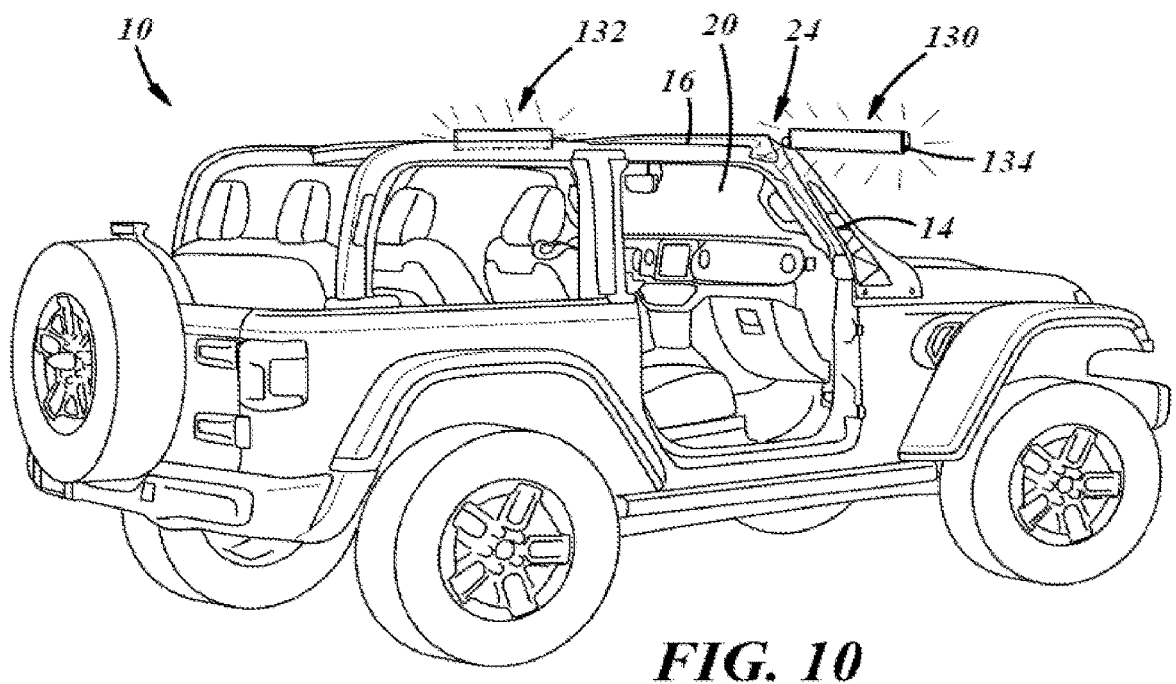
FIG. 10 is a perspective view of the vehicle showing the two accessories in different positions relative to the vehicle.

FIGS. 9 and 10 illustrate a system in which two separate supports 130, 132 are coupled to the vehicle 10, one to the first base 24 and one to the second base 26. In this example, each support 130,132 may be rotated relative to its respective base 24 or 26 without having to decouple a support 130, 132 from the other base 24 or 26. In this example, the bases 24, 26 may be constructed in the same manner as previously described, and the supports 130, 132 may also be similar to that previously described. In this example, a first support 132 includes the second retainer (e.g. like second retainer 80), and a second support 132 includes the fourth retainer (constructed like the second retainer, associated with the second base 26), and each support 130, 132 has a free 134, 136, respectively, end that is not coupled to either base 24, 26.

To move the first support 130 relative to the vehicle 10, as shown in FIG. 10, the first retainer 58 is retracted relative to the first base 24, to decouple the first retainer 58 from the second retainer 80, and the first support 130 may be rotated about the first connector 44. Likewise, to move the second support 132 relative to the vehicle 10, as shown in FIG. 10, the third retainer 58' is retracted relative to the second base 26 to decouple the third retainer 58' from the fourth retainer, and the second support 132 may be rotated about the second connector 44'. The supports 130, 132 may thus be rotated independently of each other to multiple positions to provide increased flexibility. Thus, a support 130, 132 need only be coupled to one base 24 or 26, and need not be coupled or couplable to both bases 24, 26, as described above with regards to the support 28. Further, both supports 130, 132 can be moved to, and then retained in, multiple positions without having to remove the connectors 44, 44' holding the supports 130, 132 to their bases 24, 26.

If desired for stability or otherwise, the vehicle 10 may include a bracket 140 (FIG. 9) to which the free ends 134, 136 of the supports 130, 132 are connected in one position (e.g. the original, stowed position in which the supports do not extend outwardly from the vehicle 10). Or the supports 130, 132 may be coupled to each other, and decoupled prior to movement of one or both of the supports from the original position in which they are coupled together.

While described herein as having the retainer associated with or carried by the bases (e.g. the first or third retainers) being movable relative to the retainers carried by a support 28, 130, 132, the retainer(s) carried by a base 24 or 26 could be fixed or immovable, and the retainer carried by the support 28, 130, 132 could be movable relative to the support 28, or both the retainers carried by the base and by the support could move, if desired. Thus, at least one of the first retainer and second retainer is movable relative to the other to decouple the first retainer and second retainer. Further, movement of the support relative to the first base may be done without removing the connector from the first base.

Further, the movable retainers are noted as moving axially (relative to an axis of the connectors) but the movable retainer(s) could move radially, and a projection or other retention feature of the retainers may be inserted into one of multiple circumferentially spaced openings or spaces between adjacent retention features. For example, the movable retainer may be a pin and the other retainer may include a plurality of openings or voids, that are consecutively aligned with the pin as the support 28, 130, 132 is rotated. Of course, other arrangements are possible and are within the scope of the disclosure above and appended claims.

What is claimed is:

1. An accessory mount for a vehicle, comprising:
   a first base having a first retainer with one or more retention features;
   a support having a second retainer that has one or more retention features that overlap one or more of the one or more retention features of the first retainer in different positions of the support relative to the first base;
   a connector coupling the support to the first base, and wherein one of the first retainer and second retainer is movable relative to the other retainer to couple and decouple the first retainer and second retainer without moving the connector relative to the first base to enable movement of the support to multiple positions relative to the first base and retention of the support in each of the multiple positions.

2. The mount of claim 1 which also includes an accessory carried by or having a body defining the support.

3. The mount of claim 1 wherein the support is rotatable about the connector when the first retainer and second retainer are decoupled.

4. The mount of claim 3 wherein the first retainer and the second retainer are arranged to be coupled together in multiple positions of the support relative to the first base, and to releasably retain and limit or prevent rotation of the support relative to the first base in the multiple positions.

5. The mount of claim 1 wherein the connector defines an axis of rotation about which the support is rotatable relative to the first base, and wherein the connector extends through both a first opening in the first retainer and a second opening in the second retainer.

6. The mount of claim 5 wherein the one or more retention features of the first retainer and the one or more retention features of the retention features of the second retainer are circumferentially spaced apart relative to the axis of rotation, and wherein the support may be rotated to multiple positions relative to the first base and in multiple positions of the support relative to the first base the first retainer and second retainer can be coupled with one or more of the one or more retention features of the first retainer overlapping one or more of the one or more retention features of the second retainer to limit or prevent rotation of the support relative to the first base.

7. The mount of claim 1 wherein the first retainer is movably carried by the first base for axial movement relative to the second retainer, and the first retainer has an advanced position in which the retention features of the first retainer axially overlap the retention features of the second retainer, and a retracted position in which the retention features of the first retainer do not axially overlap the retention features of the second retainer.

8. The mount of claim 7 wherein the biasing member provides a force on the first retainer to yieldably bias the first retainer to the advanced position.

9. The mount of claim 1 wherein the connector includes a shank that extends axially from a first end connected to the first base to a second end that radially overlies or overlaps part of the support to axially retain the support relative to the first base while permitting rotation of the support relative to the first base when the first retainer and the second retainer are decoupled.

10. The mount of claim 1 which also includes a second base having a third retainer with one or more retention features, and wherein the support has a fourth retainer releasably coupled with the third retainer, the fourth retainer has one or more retention features that cooperate with one or more of the one or more retention features of the third retainer in different positions of the support relative to the first base.

11. The mount of claim 10 which also includes a second connector coupling the support to the second base, and wherein at least one of the third retainer and the fourth retainer is movable relative to the other to decouple the third retainer and fourth retainer without removing the second connector from the second base to enable movement of the support relative to the second base.

12. The mount of claim 11 wherein the support is rotatable about either the second connector or about the connector coupling the support to the first base, and either the connector coupling the support to the first base is removable from the first base to permit the support to be rotated about the second connector, or the second connector is removable from the second base to permit the support to be rotated about the connector coupling the support to the first base.

13. The mount of claim 1 wherein the first base includes a tubular portion and the tubular portion has an internal opening that is threaded, and the connector includes a shank that is threadedly received in the internal opening, and the first retainer includes a tubular body that is slidably received over the tubular portion so that the first retainer is movable relative to the second retainer and relative to the connector.

14. An accessory mount for a vehicle, comprising:
    a first base having a first retainer with one or more retention features;

a support having a second retainer that has one or more retention features that overlap one or more of the one or more retention features of the first retainer in different positions of the support relative to the first base;

a connector coupling the support to the first base, the connector has a shank that extends axially from a first end connected to the first base to a second end that radially overlies or overlaps part of the support to axially retain the support relative to the first base, and wherein the first retainer is movably carried by the first base for movement relative to the second retainer, and the first retainer has an advanced position in which the retention features of the first retainer overlap the retention features of the second retainer, and a retracted position in which the retention features of the first retainer do not overlap the retention features of the second retainer so that the support can be rotated relative to the first base without moving the connector relative to the first base; and a biasing member that provides a force on the first retainer to yieldably bias the first retainer to the advanced position.

15. The mount of claim 14 wherein the connector defines an axis of rotation about which the support is rotatable relative to the first base, and wherein the connector extends through both a first opening in the first retainer and a second opening in the second retainer.

16. The mount of claim 15 wherein the one or more retention features of the first retainer and the one or more retention features of the retention features of the second retainer are circumferentially spaced apart relative to the axis of rotation, and wherein, the support may be rotated to multiple positions relative to the first base and in multiple positions of the support relative to the first base the first retainer and second retainer can be coupled with one or more of the one or more retention features of the first retainer overlapping one or more of the one or more retention features of the second retainer to limit or prevent rotation of the support relative to the first base.

17. The mount of claim 13 wherein the first base includes a tubular portion and the tubular portion has an internal opening that is threaded, and the connector includes a shank that is threadedly received in the internal opening, and the first retainer includes a tubular body that is slidably received over the tubular portion so that the first retainer is movable relative to the second retainer and relative to the connector.

* * * * *